US006600493B1

(12) United States Patent
Sethi et al.

(10) Patent No.: US 6,600,493 B1
(45) Date of Patent: Jul. 29, 2003

(54) ALLOCATING MEMORY BASED ON MEMORY DEVICE ORGANIZATION

(75) Inventors: Prashant Sethi, Folsom, CA (US); Arie Chobotaro, Kyriat ata (IL); Murali Ramadoss, Folsom, CA (US); Roman Surgutchik, Karkur (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/503,184

(22) Filed: Feb. 14, 2000

Related U.S. Application Data

(63) Continuation-in-part of application No. 09/474,651, filed on Dec. 29, 1999.

(51) Int. Cl.[7] .............................................. G06F 12/02
(52) U.S. Cl. ...................... 345/543; 345/542; 711/171
(58) Field of Search .............................. 345/543, 501, 345/530, 542, 541; 711/170–173

(56) References Cited

U.S. PATENT DOCUMENTS

| 5,107,251 A | 4/1992 | Frank et al. | |
|---|---|---|---|
| 5,113,180 A | 5/1992 | Gupta et al. | 340/747 |
| 5,247,634 A | 9/1993 | Cline et al. | |
| 5,335,322 A | 8/1994 | Mattison | |
| 5,675,793 A | 10/1997 | Crick et al. | |
| 5,793,385 A | 8/1998 | Nale | 345/515 |
| 5,900,885 A | 5/1999 | Stortz | |
| 5,905,853 A * | 5/1999 | Murakami | 345/543 |
| 5,920,881 A | 7/1999 | Porterfield | |
| 5,930,827 A | 7/1999 | Sturges | 711/170 |
| 5,953,746 A | 9/1999 | Crocker et al. | |
| 6,023,281 A * | 2/2000 | Grigor et al. | 345/543 |
| 6,308,248 B1 * | 10/2001 | Welker et al. | 711/170 |
| 6,326,973 B1 | 12/2001 | Behrbaum et al. | |
| 6,377,268 B1 * | 4/2002 | Jeddeloh | 345/542 |
| 6,430,665 B1 * | 8/2002 | Allison et al. | 711/172 |

FOREIGN PATENT DOCUMENTS

| EP | 0 513 433 | 11/1992 |
|---|---|---|
| EP | 0 851 353 | 7/1998 |
| WO | WO98/14878 | 4/1998 |

OTHER PUBLICATIONS

Newman, Gary "Memory Management Support for Tiled Array Organization", *Computer Architecture News*, vol. 20, No. 4, pp. 22–30, Sep. 1992.

* cited by examiner

*Primary Examiner*—Kee M. Tung
(74) *Attorney, Agent, or Firm*—Kenyon & Kenyon

(57) ABSTRACT

Memory is allocated for use by a graphics processor. Available portions of system memory are identified by requesting an amount of system memory from an operating system and receiving locations of the available portions from the operating system. Those available portions are then allocated for use by the graphics processor based at least in part on the devices in which the available portions are located.

25 Claims, 4 Drawing Sheets

ALLOCATING MEMORY BASED ON MEMORY DEVICE ORGANIZATION

CROSS-REFERENCE TO RELATED APPLICATION

This application is a continuation-in-part of U.S. patent application Ser. No. 09/474,651, which was filed on Dec. 29, 1999, and is entitled "ALLOCATING MEMORY."

BACKGROUND OF THE INVENTION

Embodiments of the present invention provide a method an apparatus for allocating memory for use by a graphics processor. More particularly, embodiments of the present invention provide an apparatus and method for sorting portions of memory being allocated based on memory device organization.

A graphics processor requires large amounts of contiguous memory for processing and displaying images. Dedicated "graphics" memory may be provided to meet this requirement; however, this additional memory increases the costs associated with graphics processing. Another approach is to allocate operating system (or "system") memory for use by the graphics processor. Traditionally, this approach required "locking down" large amounts of system memory for exclusive use by the graphics processor. The operating system was often left with an insufficient amount of memory as a result.

System memory can be implemented on multiple memory devices. For example, system memory may be implemented on a group of DRAM devices. Each memory device may be in an active state or an inactive state. The time it takes to access a memory device that is in an active state is less than the time it takes to access a memory device in an inactive state. In some systems, a memory device will transition to an inactive state after each memory access unless that memory device is also accessed in the next cycle, in which case it will stay in an active state at least until the next cycle.

DESCRIPTION

In general, in one aspect, the invention relates to allocating memory for use by a graphics processor. The invention features identifying available portions of system memory and allocating the available portions of system memory to the graphics processor. Among the advantages of this aspect may be one or more of the following. Identifying available portions of system memory and allocating those available portions makes it possible for the graphics processor to use system memory without "locking down" large portions of that memory beforehand. As a result, the amount of dedicated memory required by the graphics processor can be reduced without substantially adverse effects to the operating system.

Another aspect of the invention relates to allocating memory based on memory organization. This aspect of the invention features identifying available portions of system memory and allocating the available portions of system memory to the graphics processor based at least in part on the devices in which the available portions are located. Among the advantages of this aspect may be one or more of the following. Identifying available portions of system memory and allocating the available portions of system memory to the graphics processor based, at least in part on the devices in which the available portions are located, increases the number of accesses to memory devices that are in the active state. Because it is quicker to access memory that is in an active state than it is to access memory in an inactive state, as a result of this aspect of the invention the overall memory access time is decreased.

Other features and advantages of the invention will become apparent from the following description and drawings.

Figure 1:
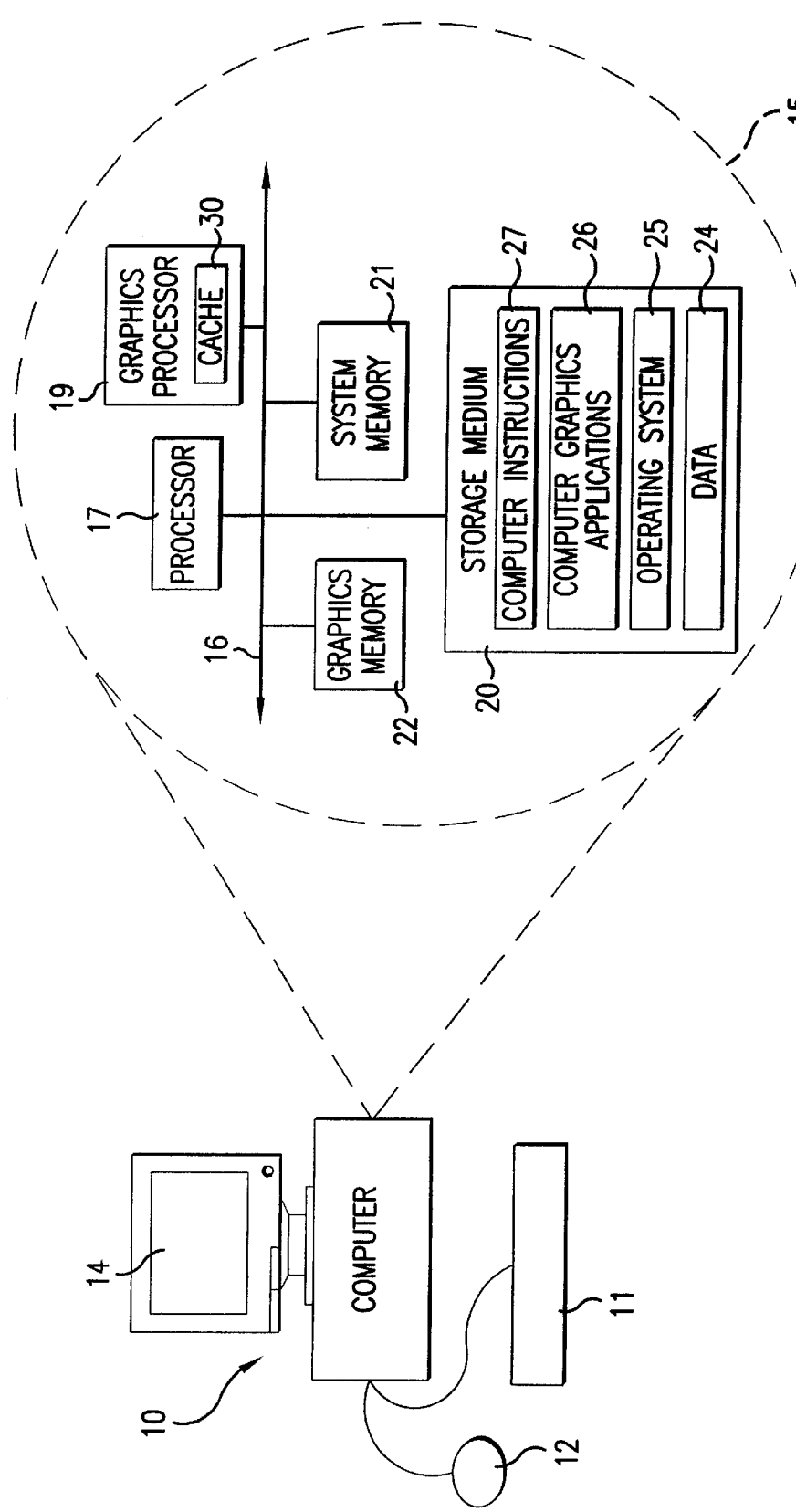
FIG. 1 is a view of a computer on which an embodiment of the invention may be implemented.

In FIG. 1, a computer 10 is shown on which an embodiment of the invention is implemented. Computer 10 includes input devices, such as keyboard 11 and mouse 12, and a display screen 14, among other things. Internal components of computer 10 are shown in view 15. These include one or more buses 16, processor 17, graphics processor 19, storage medium 20, system memory 21, such as a RAM ("Random Access Memory"), and graphics memory 22.

Storage medium 20 is a computer hard disk or other memory device that stores data 24, an operating system 25, such as Microsoft® Windows98®, computer graphics applications 26, and computer instructions 27 for allocating memory for use by graphics processor 19. Graphics processor 19 is a microprocessor or other device that may reside on a graphics accelerator card (not shown) on computer 10. Graphics processor 19 executes graphics applications 26 to produce imagery, including video, based on data 24.

Figure 2:
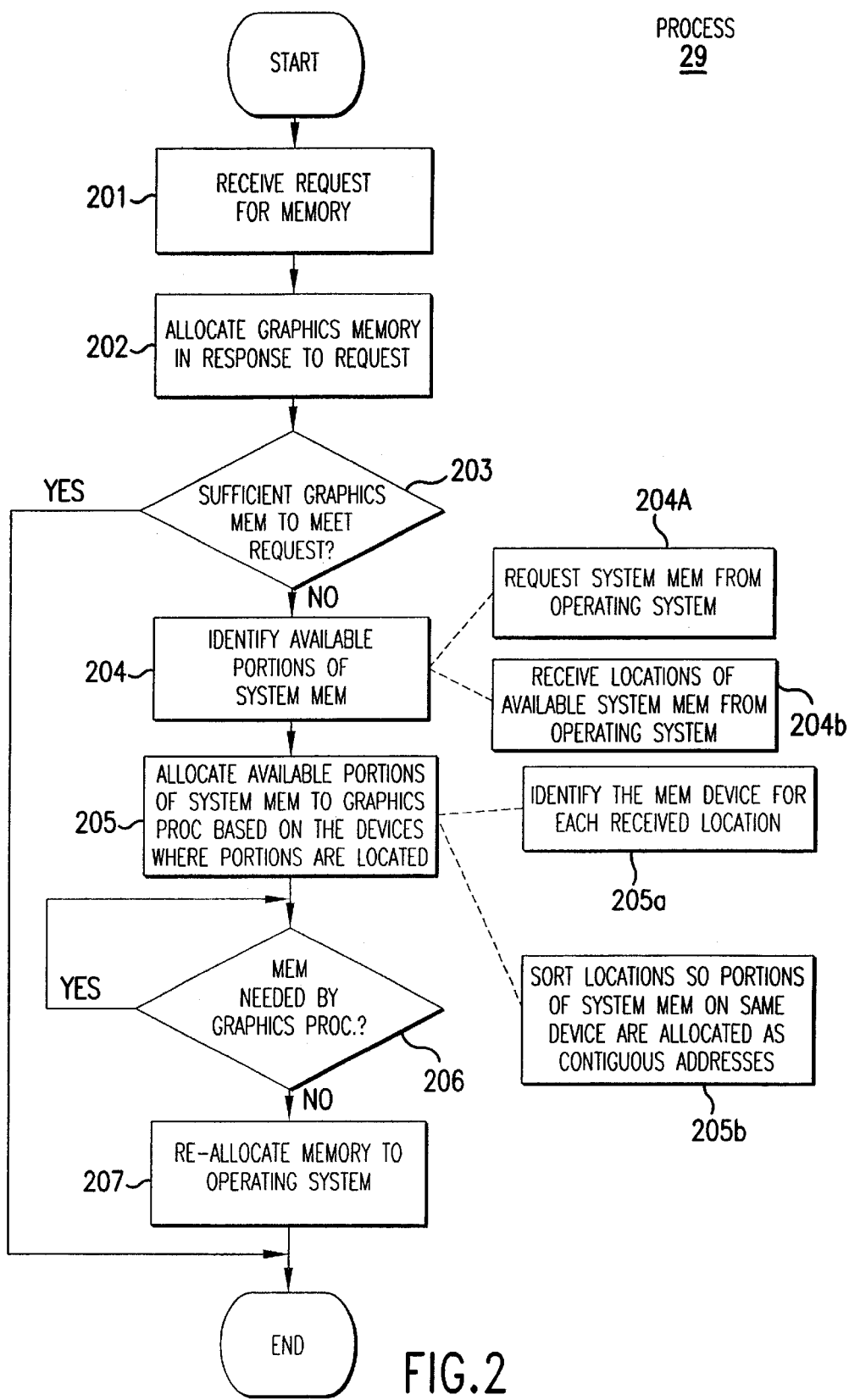
FIG. 2 is a flowchart showing a process for allocating memory to a graphics processor according to one embodiment of the invention.

During operation, graphics processor 19 requires memory to process data 24 and to generate images based on that data. In this embodiment, both graphics memory 22 and portions of system memory 21 are used by graphics processor 19 for these purposes. A process 29 for dynamically allocating such memory to graphics processor 19 is shown in FIG. 2. Process 29 is implemented by instructions 27 running on processor 17.

To begin, a memory manager driver (not shown) in computer 10 makes a determination as to how much memory it will need to execute a given graphics application. The driver then formulates a request for the required amount of memory. Process 29 (executing in processor 17) receives (201) the request and, in response, allocates (202) available portions of graphics memory 22 (also referred to as graphics "aperture") to graphics processor 19. This may be done via a memory map, as described in more detail below.

If the amount of available memory in graphics memory 22 is sufficient to satisfy the request from graphics processor 19 (203), memory allocation process 29 ends. If there is not sufficient available graphics memory (203), process 29 allocates available portions of system memory 21 to make up for the deficit amount of graphics memory.

To this end, process 29 identifies (204) available portions of system memory 21. Process 29 requests (204a), and receives (204b), the locations of available portions of system memory 21 from operating system 25. System memory 21 is addressable in "pages" (or blocks), each of which is about four KB ("KiloBytes") in size. The locations of available system memory provided by operating system 25 therefore correlate to available pages of memory. These pages may be contiguous portions of system memory or, alternatively, they may be discontinuous portions of system memory 21.

In one embodiment, process 29 allocates (205) the available portions of system memory, for use by graphics processor 19, based at least in part on the devices where the available portions are located. According to one method of performing this allocation, process 29 generates a memory map to the available portions of system memory (and to graphics memory 22, if applicable). The allocation of available portions of system memory according to this method may include first identifying (205a) the memory device for each of the received locations. Next, the received locations may be sorted (205b), based on the identified memory devices, so that portions of system memory located on the same device are allocated to the graphics processor as contiguous addresses. Sorting the locations means sorting entries that correspond to the locations; the information stored at the locations is not itself sorted. For example, entries corresponding to the available portions of system memory may be bucket sorted based on the memory device where each is located so that portions located on the same device are written to adjacent entries in a memory page table.

In one embodiment, the memory map is a page table that is generated by process 29 and programmed into an internal memory (cache) 30 of graphics processor 19. The table itself may already exist in cache 30, in which case process 29 reprograms the table.

Figure 3:
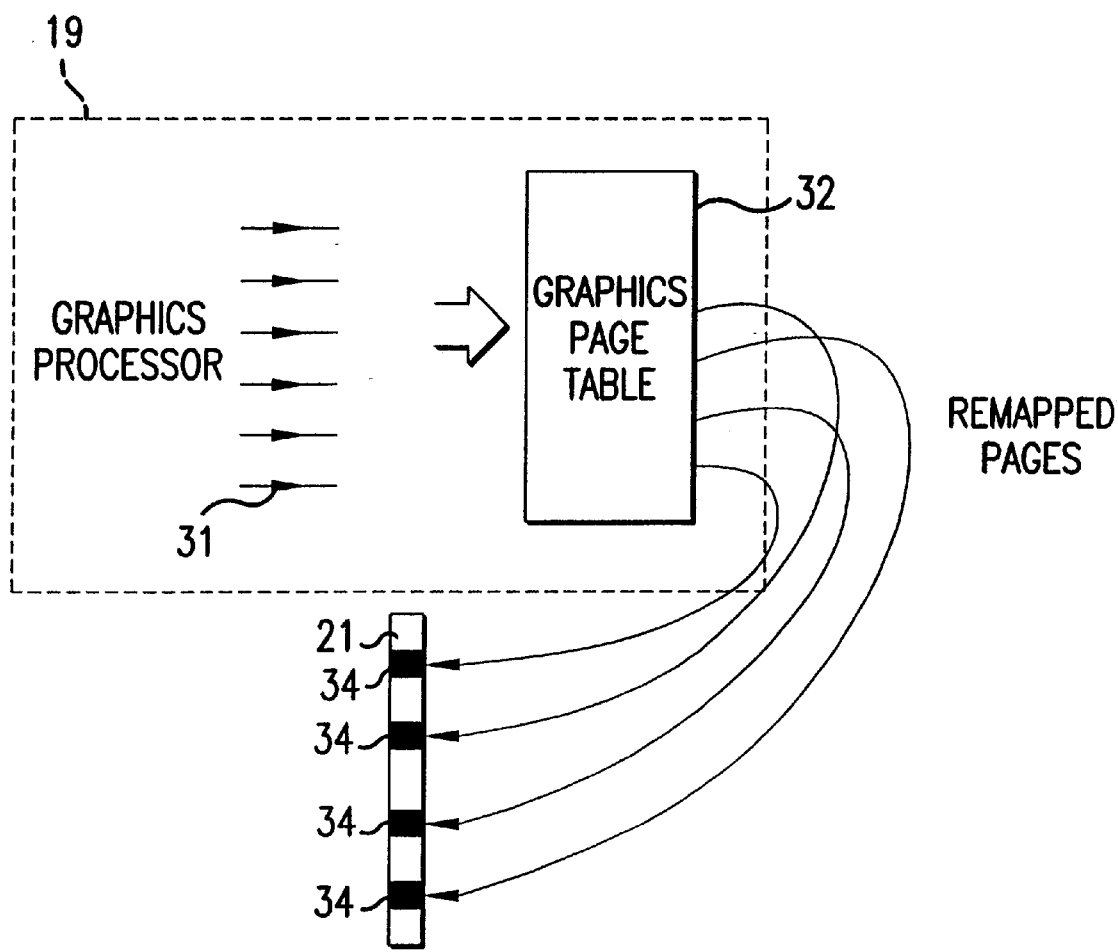
FIG. 3 is a block diagram that shows, conceptually, how memory is allocated according to one embodiment of the invention.

The page table maps physically discontinuous portions of system memory 21 and graphics memory so that they appear to graphics processor 19 to be a single contiguous memory. Contiguous addresses provided from graphics processor 19 are mapped to pages of available system memory 21 (and, possibly, graphics memory 22), without regard to whether those pages constitute contiguous memory. This concept is illustrated graphically in FIG. 3. There, graphics processor 19 outputs read/write requests 31 to contiguous memory addresses. These requests 31 pass through page table 32, which maps the contiguous memory addresses to discontinuous pages 34 of system memory 21 (and potentially, although not shown, graphics memory 22). In this embodiment, system memory 21 is shown as a single memory device.

Figure 4:
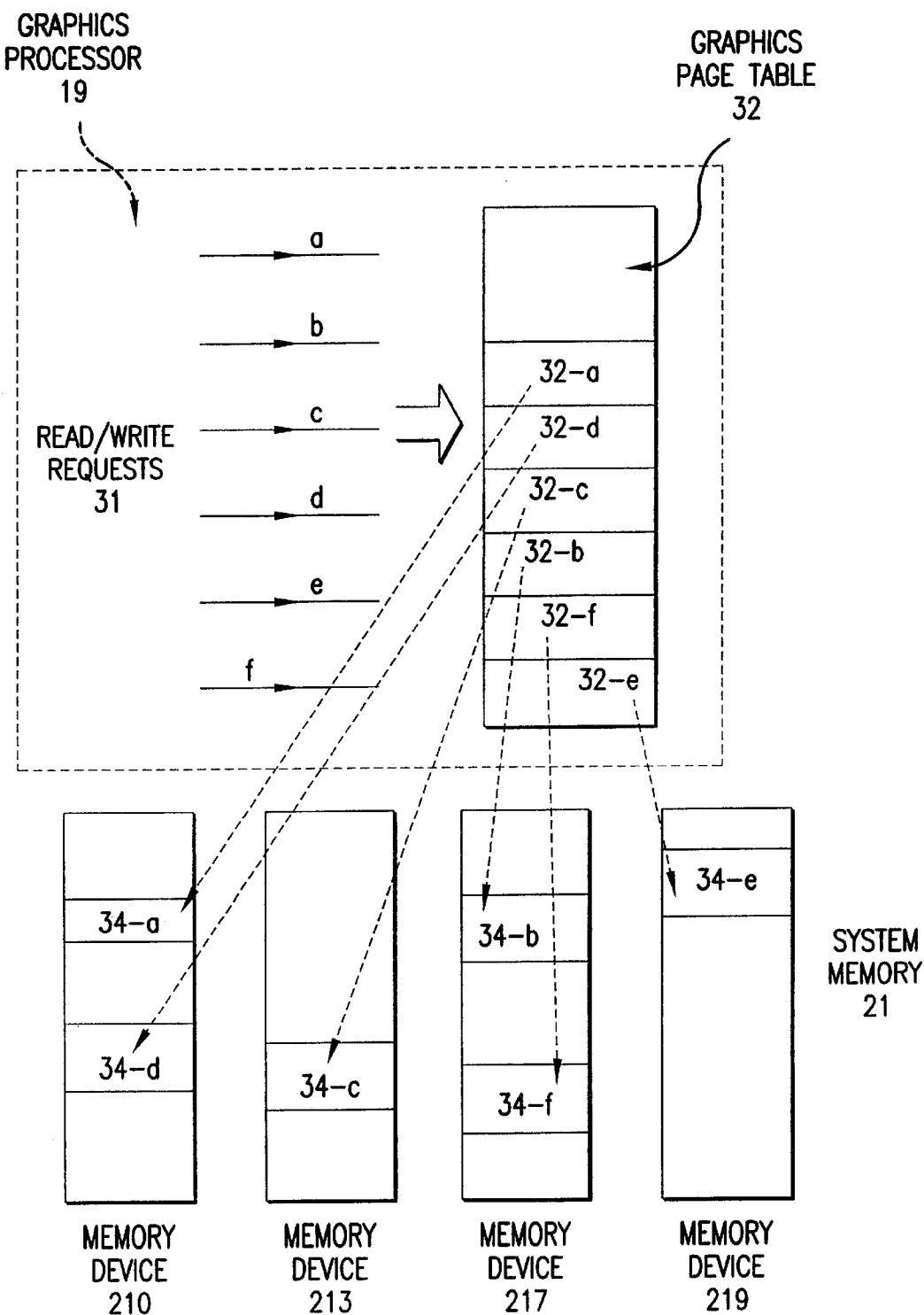
FIG. 4 is a block diagram that shows, conceptually, how memory is allocated based on memory device organization according to a further embodiment of the invention.

FIG. 4 is a block diagram that shows, conceptually, how memory is allocated based on memory device organization according to a further embodiment of the invention. FIG. 4 shows an embodiment in which system memory 21 is implemented on four memory devices, which are labeled 210, 213, 217, and 219. In this embodiment, the available portions of system memory are allocated to the graphics processor based at least in part on the devices in which the available portions are located. For example, FIG. 4 shows graphics processor 19 receiving six requests (a, b, c, d, e, and f) for portions of system memory. Process 29 (FIG. 2) identifies six portions of system memory, which are shown in FIG. 4 as pages 34-a, 34-b, 34-c, 34-d, 34-e, and 34-f. Pages 34-a and 34-d are located in memory device 210, page 34-c is located in memory device 213, pages 34-b and 34-f are located in memory device 217, and page 34-e is located in memory device 219.

In this alterative embodiment, process 29 then creates entries in an array (not shown) created for each of the identified pages. In an alternative embodiment, the array may be created by the operating system 25. Process 29 then sorts the array so that portions located on the same device are written to adjacent entries in memory page table 32. For example, a bucket sort algorithm may be used. In the example shown in FIG. 4, entry 32-a corresponds to location 34-a in memory device 210 and may be the first entry in the array. Because location 34-d is also in memory device 210, entry 32-d may be placed in the next entry in the array. Because none of the other identified portions is in memory device 210, entry 34-c may remain the third entry in the array. Location 34-c is the only entry in memory device 213, and therefore entry 32-d may be the next entry in the array. Because location 34-f is in the same memory device as 34-d (memory device 217), item 34-f is placed in the next entry in the array. Finally, item 32-e is placed in the last entry in the array. The array may be written into graphics page table 32. According to another embodiment, the available portions of system memory may be directly allocated to the graphics processor based on the devices in which they are located without sorting.

Once the appropriate amount of memory has been allocated, graphics processor 19 performs its image processing and generating functions out of that memory. When graphics processor 19 no longer needs the allocated memory (206), it issues an instruction to process 29. Process 29 then re-allocates (207) the system memory (allocated in 205) to operating system 25. This may be done by re-programming the page table in cache 30 so that system memory is no longer available to graphics processor 19. Process 29 also frees used graphics memory by providing unused graphics memory addresses to a "pool" of available addresses. When graphics processor needs additional memory, process 29 is repeated. Pseudo-code for implementing one embodiment of process 29 is shown in the attached Appendix.

Process 29 is described with respect to a computer that includes a dedicated graphics memory 22. However, process 29 also operates on computers that include no dedicated graphics memory. For example, all memory for graphics processor 19 may be allocated out of system memory 21. In this case, steps 202 and 203 are omitted from process 29, with the remainder of the process being identical to that shown in FIG. 2. Similarly, memory may be allocated to graphics processor 19 from other memories (in addition to those shown).

Although process 29 is described with respect to computer 10, process 29 is not limited to use with any particular hardware or software configuration; it may find applicability in any computing or processing environment. Process 29 may be implemented in hardware, software, or a combination of the two. Process 29 may be implemented in computer programs executing on programmable computers that each include a processor, a storage medium readable by the processor (including volatile and non-volatile memory and/or storage elements), at least one input device, and one or more output devices. Program code may be applied to data entered using an input device to perform process 29 and to generate output information. The output information may be applied to one or more output devices, such as display screen 14.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 29. Process 29 may also be implemented as a computer-readable storage medium, configured with a computer program, where, upon execution, instructions in the computer program cause the computer to operate in accordance with process 29.

Other embodiments not described herein are also within the scope of the following claims. For example, the invention can be implemented on computer graphics hardware other than that shown in FIG. 1. The steps shown in FIG. 2 can be re-ordered where appropriate and one or more of those steps may be executed concurrently or omitted. Memory maps other than a page table may be used in the invention, as can memory devices other than those shown in FIG. 1.

What is claimed is:

1. A method of allocating memory for use by a graphics processor, comprising:
   identifying available portions of a system memory, the system memory comprising a plurality of memory devices, wherein identifying comprises receiving an array containing locations of available portions of system memory; and
   allocating the available portions of the system memory to the graphics processor, wherein each of the available portions located on a first memory device are allocated as contiguous addresses and each of the available portions located on a second memory device are allocated as contiguous addresses, wherein allocating comprises rearranging the array so that available portions located on the same memory device are adjacent to each other in the array, wherein rearranging comprises changing the relative order within the array of an available portion located on the first memory device and an available portion located on the second memory device.

2. The method of claim 1, wherein allocating further comprises generating a memory map for the graphics processor to the available portions of system memory.

3. The method of claim 2, wherein rearranging further comprises sorting entries that correspond to the available portions of system memory and writing the entries to a memory page table so that portions located on the same memory device have adjacent entries in the memory page table.

4. The method of claim 2, wherein:
   two or more of the available portions of system memory are located on the same memory device; and
   the memory map makes available portions of system memory that are located on the same memory device appear contiguous to the graphics processor.

5. The method of claim 4, wherein:
   the available portions of system memory comprise physically discontinuous portions of system memory; and
   the memory map makes the physically discontinuous portions of system memory appear contiguous to the graphics processor.

6. The method of claim 1, wherein rearranging the array comprises performing a bucket sort.

7. The method of claim 1, further comprising:
   receiving a request for memory from the graphics processor;
   allocating graphics memory to the graphics processor in response to the request; and
   wherein said allocating the system memory is only performed if there is not sufficient graphics memory to satisfy the request.

8. The method of claim 1, further comprising re-allocating the available portions of system memory to an operating system after the available portions are no longer needed by the graphics processor.

9. An article of manufacture comprising a computer-readable medium which stores computer instructions for allocating memory for use by a graphics processor, the computer instructions causing a computer to perform:
   identifying available portions of a system memory, the system memory comprising a plurality of memory devices, wherein identifying comprises receiving an array containing locations of available portions of system memory; and
   allocating the available portions of the system memory to the graphics processor, wherein each of the available portions located on a first memory device are allocated as contiguous addresses and each of the available portions located on a second memory device are allocated as contiguous addresses, wherein allocating comprises rearranging the array so that available portions located on the same memory device are adjacent to each other in the array, wherein rearranging comprises changing the relative order within the array of an available portion located on the first memory device and an available portion located on the second memory device.

10. The article of claim 9, wherein allocating further comprises generating a memory map for the graphics processor to the available portions of system memory.

11. The article of claim 10, wherein rearranging further comprises sorting entries that correspond to the available portions of system memory and writing the entries to a memory page table so that portions located on the same memory device have adjacent entries in the memory page table.

12. The article of claim 10, wherein:
   two or more of the available portions of system memory are located on the same memory device; and
   the memory map makes available portions of system memory that are located on the same memory device appear contiguous to the graphics processor.

13. The article of claim 12, wherein:
   the available portions of system memory comprise physically discontinuous portions of system memory; and
   the memory map makes the physically discontinuous portions of system memory appear contiguous to the graphics processor.

14. The article of claim 9, wherein rearranging the array comprises performing a bucket sort.

15. The article of claim 9, further comprising instructions that cause the computer to perform:
   receiving a request for memory from the graphics processor;
   allocating graphics memory to the graphics processor in response to the request; and
   wherein said allocating the system memory is only performed if there is not sufficient graphics memory to satisfy the request.

16. The article of claim 9, further comprising instructions that cause the computer to perform re-allocating the available portions of system memory to an operating system after the available portions are no longer needed by the graphics processor.

17. An apparatus for allocating memory for use by a graphics processor, comprising:
   a memory which stores computer instructions; and a processor which executes the computer instructions to perform (i) identifying available portions of a system memory by receiving an array containing locations of available portions of system memory, the system memory comprising a plurality of memory devices; and (ii) allocating the available portions of the system memory to the graphics processor, wherein the allocation is based at least in part on the organization of the memory devices where the available portions are located, and wherein allocating comprises rearranging the array so that available portions located on the same memory device are adjacent to each other in the array, wherein rearranging comprises changing the relative order within the array of an available portion located on the first memory device and an available portion located on the second memory device.

18. The apparatus of claim 1, wherein available portions of system memory are allocated to the graphics processor so that available portions that are located on the first memory device are allocated to the graphics processor as addresses that are contiguous to each other and available portions that are located on the second memory device are allocated as addresses that are contiguous to each other.

19. The apparatus of claim 17, wherein allocating further comprises generating a memory map for the graphics processor to the available portions of system memory.

20. The apparatus of claim 19, wherein rearranging further comprises sorting entries that correspond to the available portions of system memory and writing the entries to a memory page table so that portions located on the same memory device have adjacent entries in the memory page table.

21. The apparatus of claim 19, wherein:

two or more of the available portions of system memory are located on the same memory device; and the memory map makes available portions of system memory that are located on the same memory device appear contiguous to the graphics processor.

22. The apparatus of claim 21, wherein:

the available portions of system memory comprise physically discontinuous portions of system memory; and the memory map makes the physically discontinuous portions of system memory appear contiguous to the graphics processor.

23. The apparatus of claim 17, wherein rearranging the array comprises performing a bucket sort.

24. The apparatus of claim 17, wherein the processor executes computer instructions to perform:

receiving a request for memory from the graphics processor, allocating graphics memory to the graphics processor in response to the request; and wherein said allocating the system memory is only performed if there is not sufficient graphics memory to satisfy the request.

25. The apparatus of claim 17, wherein the processor executes computer instructions to perform re-allocating the available portions of system memory to an operating system after the available portions are no longer needed by the graphics processor.

* * * * *